United States Patent
Ou et al.

(10) Patent No.: US 12,417,179 B2
(45) Date of Patent: Sep. 16, 2025

(54) ADAPTIVE SYSTEM PROBE ACTION TO MINIMIZE INPUT/OUTPUT DIRTY DATA TRANSFERS

(71) Applicant: Advanced Micro Devices, Inc., Santa Clara, CA (US)

(72) Inventors: Li Ou, Austin, TX (US); Ganesh Balakrishnan, Austin, TX (US); Amit Apte, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/399,283

(22) Filed: Dec. 28, 2023

(65) Prior Publication Data
US 2025/0217292 A1    Jul. 3, 2025

(51) Int. Cl.
*G06F 12/0815*   (2016.01)
*G06F 12/0877*   (2016.01)

(52) U.S. Cl.
CPC ...... *G06F 12/0815* (2013.01); *G06F 12/0877* (2013.01)

(58) Field of Classification Search
CPC .................................................. G06F 12/0877
USPC ......................................................... 711/141
See application file for complete search history.

(56) References Cited

U.S. PATENT DOCUMENTS

| | | |
|---|---|---|
| 2003/0115402 A1 | 6/2003 | Dahlgren et al. |
| 2004/0117559 A1 | 6/2004 | Glasco et al. |
| 2005/0033924 A1 | 2/2005 | Glasco |
| 2007/0186057 A1* | 8/2007 | Moll .............. G06F 12/0802 711/146 |
| 2013/0339610 A1* | 12/2013 | Collura ........... G06F 12/0811 711/E12.024 |
| 2019/0332538 A1 | 10/2019 | Milojicic et al. |
| 2020/0104164 A1* | 4/2020 | Pawlowski ....... G06F 9/3877 |
| 2023/0067307 A1* | 3/2023 | Natarajan ........ G06F 12/1441 |
| 2023/0273731 A1 | 8/2023 | Ki et al. |
| 2024/0126538 A1* | 4/2024 | Koval ................ G06F 9/4401 |

OTHER PUBLICATIONS

PCT/US2024/034098 , "International Search Report and Written Opinion", International Application No. PCT/US2024/034098, Sep. 27, 2024, 8 pages.

* cited by examiner

*Primary Examiner* — Yaima Rigol
(74) *Attorney, Agent, or Firm* — FIG. 1 Patents (57) ABSTRACT

Adaptive system probe action to minimize input/output dirty data transfers is described. In one or more implementations, a system includes a processor, a memory configured to store data, and a cache configured to store a portion of the data stored in the memory for execution by the processor. The system also includes a cache coherence controller including a cache line history. The cache coherence controller is configured detect a direct memory access request from an input/output device. The direct memory access request is associated with an input/output operation involving the data. The cache coherence controller is further configured to identify a cache line associated with the direct memory access request, and, in response to the cache line history including a dirty data transfer record corresponding to the cache line, selectively send a probe to the cache based on a state of the cache line.

20 Claims, 6 Drawing Sheets

ADAPTIVE SYSTEM PROBE ACTION TO MINIMIZE INPUT/OUTPUT DIRTY DATA TRANSFERS

BACKGROUND

Various operations of computing systems involve transferring data between memory (e.g., main memory) and other devices (e.g., peripheral devices). Advances in memory access techniques continue to be sought to improve performance of the computing systems. One example advance is direct memory access (DMA), which is a technique used to enhance data transfer efficiency between devices and memory. Instead of relying on a central processing unit (CPU) for every data transfer, DMA allows the devices to directly access the memory without CPU intervention. This greatly reduces the CPU's workload and improves overall system performance.

DETAILED DESCRIPTION

Overview

In I/O workloads, where there are substantial interactions between cores and I/O devices, the complexity of such engagements can be reduced to a simpler producer-consumer model. In this model, the producer generates I/O data, and the consumer processes it, with DMA buffers, allocated into system memories, serving as the primary interfaces for their interaction. For instance, in an application where a high-speed network interface card (NIC) is used to transmit data, the cores act as producers, preparing and writing network packets into the DMA buffers, while the NIC, as the consumer, reads the packets from the DMA buffers, transmitting the packets to the network.

Within this model of interaction, high-performance I/O devices necessitate the collaborative operation of multiple cores to produce or consume I/O data sufficiently rapidly to support the high I/O speeds that modern I/O devices can deliver. In a standard I/O software stack, the same DMA buffers are shared among multiple cores driving the same I/O device. Taking a transfer control protocol/Internet protocol (TCP/IP) implementation as an example, a shared buffer pool is pre-allocated for each compute non-uniform memory access or "NUMA" node. All cores from the same compute NUMA node retrieve buffers from a common pool before driving the NIC to transmit data, and subsequently return the buffers to the pool after the NIC has completed its transmission, leading to potential issues with the high latency of the transfer of dirty data among cores, and possible impacts on performance and I/O device capability.

Under current coherence protocols, specific operational considerations come to light in the handling of dirty data within the context of DMA read requests. A conventional procedure involves dispatching probes from a coherence point to caches, the objective being to fetch dirty data without inducing a state change in a cache line-a no-operation (no-op) action. Upon the production and subsequent consumption of I/O data by a core and I/O device respectively, through the DMA reads, related DMA buffers are reintegrated into the buffer pool, being rendered available for impending I/O transactions. Post-consumption, modified cache lines residing in the original core cache are rendered functionally redundant, indicating that their retention does not directly serve subsequent computational or transactional processes.

The systems and techniques disclosed herein change the probe action sent to core caches responsive to DMA read requests. Instead of proceeding with normal operations (i.e., not changing the cache line state), the coherence point functions in one of two probe modes for DMA reads according to historical records that identify whether dirty data transfers were triggered by previous requests for the same cache line. In a first mode, the coherence point functions normally and does not change the cache line state. In a second mode, the coherence point changes the cache line state to avoid future dirty data transfers. In one or more implementations of the second mode, the coherence point changes the cache line state either by invalidating the cache line or by converting the dirty cache line to a clean cache line.

In one or more implementations, the coherence point is a cache coherence controller implemented in hardware, software, or a combination of both hardware and software. The cache coherence controller is configured to execute an adaptive algorithm to perform operations such as those described above. To summarize briefly, the adaptive algorithm enables the cache coherence controller to minimize unnecessary later dirty data transfers by switching a probe action sent to core caches on-the-fly according to system data sharing patterns. The adaptive algorithm forces cache line invalidation or converts cache line state from dirty to clean when dirty data transfers were observed from a cache line. The adaptive algorithm also switches to no operation probes if data sharing is minimized.

The systems and techniques described herein provide several advantages over existing solutions. For example, the disclosed systems and techniques deliver high I/O performance to customers under default or out-of-the-box configurations without complex software modifications. This is because the adaptive algorithm is implemented as part of the cache coherence controller, which is included as part of a processor package (e.g., a system-on-a-chip) and is not reliant on customer-side software configurations for implementation. Moreover, this is particularly valuable because end users are often reluctant to implement complex software changes that divert from default software configurations. Moreover, in many use cases, customized software configurations are not viable in a customer's production environment. The systems and techniques described herein provide at least these advantages over existing solutions.

In some aspects, the techniques described herein relate to a system including a processor, a memory configured to store data, a cache configured to store a portion of the data stored in the memory for execution by the processor, and a cache coherence controller including a cache line history, the cache coherence controller configured to identify a cache line associated with a direct memory access request, the direct memory access request associated with an operation involving the data, and responsive to the cache line history including a dirty data transfer record corresponding to the cache line, selectively send a probe to the cache.

In some aspects, the techniques described herein relate to a system, wherein the cache coherence controller is configured to selectively send the probe to the cache based on a state of the cache line, the state of the cache line including a modified state, an exclusive state, a shared state, or an invalid state.

In some aspects, the techniques described herein relate to a system, wherein the cache coherence controller is further configured to, in response to determining that the state of the cache line is the exclusive state, send the probe to the cache to invalidate the cache line.

In some aspects, the techniques described herein relate to a system, wherein the cache coherence controller is further configured to, in response to determining that the state of the cache line is the shared state, send the probe to convert the state of the cache line from a dirty shared state to a clean shared state.

In some aspects, the techniques described herein relate to a system, wherein the processor includes a first core and a second core, and wherein the cache includes a first cache corresponding to the first core and a second cache corresponding to the second core.

In some aspects, the techniques described herein relate to a system, wherein the first cache stores the portion of the data in the cache line.

In some aspects, the techniques described herein relate to a system, wherein the first core transfers the portion of the data from the first cache to the second cache.

In some aspects, the techniques described herein relate to a system, wherein the first core modifies the portion of the data to create a new portion of the data that is different from the portion of the data.

In some aspects, the techniques described herein relate to a system, wherein the cache coherence controller is further configured to update the cache line history to reflect that the portion of the data was modified before being transferred to the second cache.

In some aspects, the techniques described herein relate to a system, wherein the operation involving the data includes an input or output operation.

In some aspects, the techniques described herein relate to a cache coherence controller including a memory configured to store a cache line history, and a hardware circuitry configured to identify a cache line associated with a direct memory access request, the direct memory access request associated with an operation involving data stored in a cache, and responsive to the cache line history including a dirty data transfer record corresponding to the cache line, selectively send a probe to the cache.

In some aspects, the techniques described herein relate to a cache coherence controller, wherein hardware circuitry includes the memory.

In some aspects, the techniques described herein relate to a cache coherence controller, wherein the hardware circuitry is configured to selectively send the probe to the cache based on a state, the state including a modified state, an exclusive state, a shared state, or an invalid state.

In some aspects, the techniques described herein relate to a cache coherence controller, wherein the hardware circuitry is further configured to, in response to determining that the state of the cache line is the shared state, send the probe to convert the state of the cache line from a dirty shared state to a clean shared state.

In some aspects, the techniques described herein relate to a cache coherence controller, wherein the hardware circuitry is further configured to update the cache line history to reflect that a portion of the data was modified before being transferred to the cache.

In some aspects, the techniques described herein relate to a cache coherence controller, wherein the operation involving the data includes an input operation or an output operation.

In some aspects, the techniques described herein relate to a method including detecting, by a cache coherence controller, a direct memory access request from a direct memory access engine of an input/output device, the direct memory access request associated with an input/output operation performed by the input/output device, and responsive to detecting the direct memory access request, selectively executing, by the cache coherence controller, an adaptive algorithm to ensure coherency of data between a plurality of caches and a memory, the data associated with the input/output operation.

In some aspects, the techniques described herein relate to a method, wherein selectively executing, by the cache coherence controller, the adaptive algorithm includes executing, by the cache coherence controller, the adaptive algorithm in response to the data being associated with a dirty data transfer from a first cache of the plurality of caches to a second cache of the plurality of caches.

In some aspects, the techniques described herein relate to a method, wherein executing, by the cache coherence controller, the adaptive algorithm includes determining if a state of a cache line of the first cache is an exclusive state or a shared state.

In some aspects, the techniques described herein relate to a method, further including in response to determining that the state of the cache line of the first cache is the exclusive state, sending a probe to invalidate the cache line of the first cache, or in response to determining that the state of the cache line of the first cache is the shared state, sending a probe to convert the state of the cache line of the first cache from a dirty shared state to a clean shared state.

Figure 1:
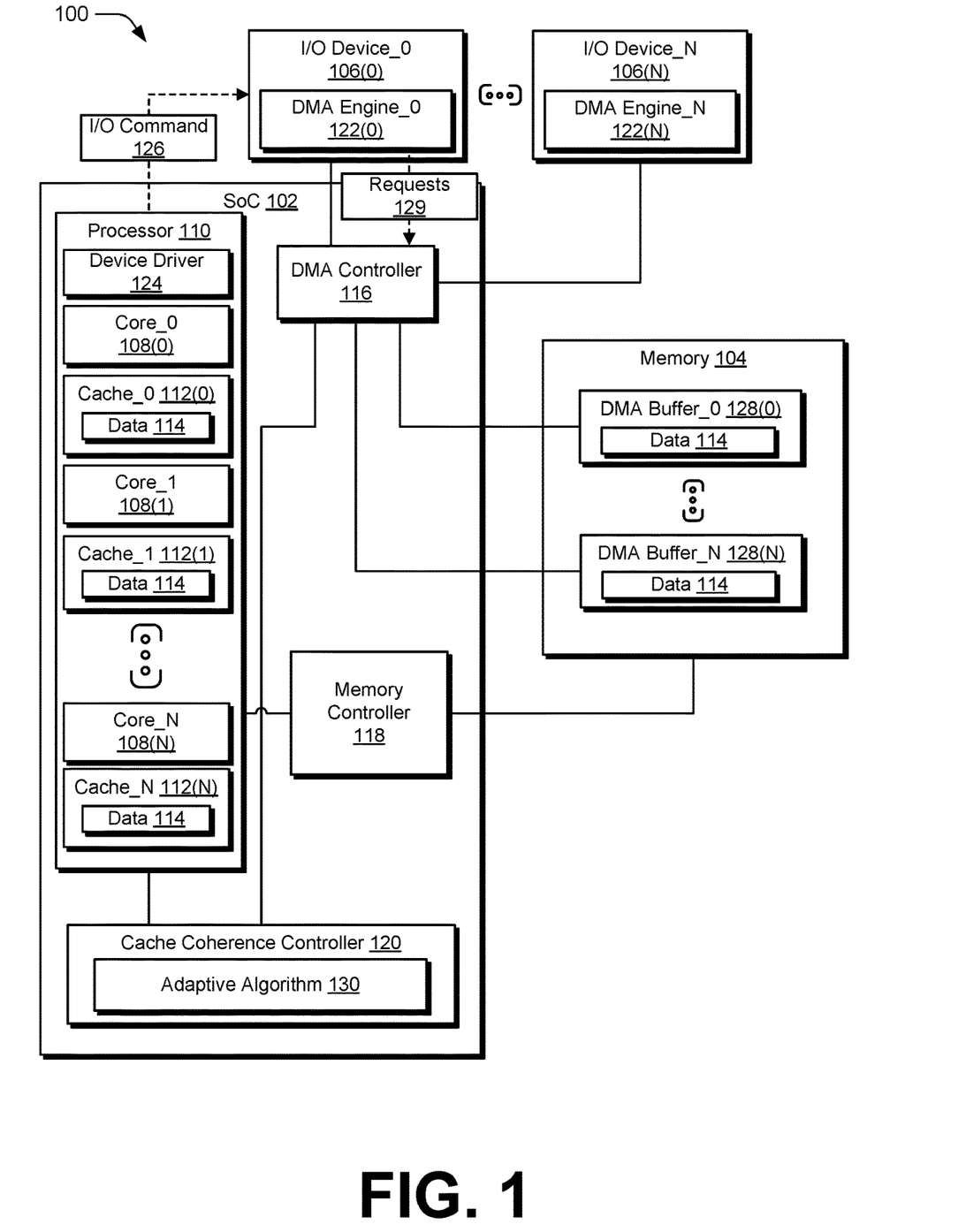
FIG. 1 is a block diagram depicting a non-limiting example system having a system-on-chip (SoC), a memory, and one or more I/O devices.

FIG. 1 is a block diagram of a non-limiting example system 100 having a system-on-chip (SoC) 102, a memory 104, and one or more I/O devices 106(0)-106(N). The system 100 is operable to minimize unnecessary dirty data transfers among two or more cores 108(0)-108(N) of a processor 110. Each of the cores 108(0)-108(N) is associated with a corresponding cache memory 112(0)-112(N) that is configured to store at least a portion of data 114 obtained from the memory 104 for use by its respective core 108. The illustrated SoC 102 also includes a DMA controller 116, a memory controller 118, and a cache coherence controller 120 which will be described in detail below. The DMA controller 116, the memory controller 118, and the cache coherence controller 120, in one or more implementations, include hardware circuitry designed to enable the corresponding controllers to perform various operations described herein.

Examples of devices or apparatuses in which the system 100 is implemented include, but are not limited to, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and other computing devices or systems.

The processor 110 is an electronic circuit that performs various operations on and/or using the data 114 stored in the memory 104. In the illustrated example, the processor 110 is combined with the DMA controller 116, the memory controller 118, and the cache coherence controller 120 as part of the SoC 102. In one or more implementations, additional or alternative components are included as part of the SoC 102. Examples of the processor 110 include, but are not limited to, a central processing unit (CPU), a graphics processing unit (GPU), a field programmable gate array (FPGA), an accelerated processing unit (APU), and a digital signal processor (DSP), to name a few. Moreover, the SoC 102 itself, in some implementations, is a CPU, a GPU, an FPGA, an APU, or a DSP, for example.

In the illustrated example, the processor 110, the DMA controller 116, the memory controller 118, and the cache coherence controller 120 are coupled to one another via one or more wired or wireless connections. Example wired connections include, but are not limited to, memory channels, buses (e.g., data, system, I/O, and/or memory busses), interconnects, through silicon vias, traces, and planes. In one example, at least one of the connections is a Peripheral Component Interconnect Express (PCIe) bus. Other example connections include optical connections, fiber optic connections, and/or connections or links based on quantum entanglement.

As introduced above, the processor 110 includes the cores 108, which are individual processing units that read and execute instructions (e.g., of a program). Example instructions include instructions to add the data 114, to move the data 114 (e.g., from the memory 104 to the cache 112), and to branch the data 114. Aspects of the techniques described herein address dirty data transfers among the two or more caches 112. Accordingly, in the non-limiting example described herein, the processor 110 is a multi-core processor having more than one core 108.

The processor 110 is capable of being implemented in accordance with various processor architectures. Some example architectures include, but are not limited to, a monolithic processor architecture, a chiplet-based processor architecture (e.g., core complex "CCX" and core complex die "CCD"), multi-chip modular processor architecture (e.g., multiple independent chips mounted on a single package), and a "big. LITTLE" processor architecture (e.g., a number of "big" high-performance cores along with a number of "LITTLE" power-efficient cores on the same processor die). Moreover, the processor 110 is capable of being implemented on the same die, the same package, or across multiple connected dies or packages. The processor 110, in one or more implementations, is part of an SoC (e.g., as shown in the SoC 102) or a system-in-package (SiP) along with other components illustrated and described with reference to FIG. 1.

The cache 112, in some implementations, is or includes a level 1 cache (L1 cache) that stores data (e.g., at least a portion of the data 114) and instructions that are immediately needed by the respective core 108 without any significant delay. The cache 112, in some implementations, also is or includes a level 2 cache (L2 cache). The L2 cache alternatively is part of a shared cache (not shown) that is shared among more than one core 108. A shared cache, in some implementations, is or includes a level 3 cache (L3 cache). A core 108 first checks its respective cache 112 (e.g., L1 and L2) for the data 114 needed to perform operations before then moving on to another cache level (e.g., a shared L3 cache), and then the memory 104 as part of a memory hierarchy.

The memory 104 is a device or system that is used to store information, such as the data 114, for immediate use in a device, such as by the processor 110 or a core 108 thereof, by a DMA engine 122 of the I/O device 106, or by an in-memory processor (not shown), which is referred to as a processing-in-memory (PIM) component. The memory 104 is implemented as a printed circuit board, on which one or more physical memory chips are disposed (e.g., via physical and communicative coupling using one or more sockets). In other words, the memory 104 is mounted on a printed circuit board and this construction, along with the communicative couplings (e.g., control signals and buses) and one or more sockets integral with the printed circuit board, form the memory 104.

In at least one example, the memory 104 corresponds to or includes volatile memory, examples of which include random-access memory (RAM), dynamic random-access memory (DRAM), synchronous dynamic random-access memory (SDRAM), static random-access memory (SRAM), and memristors. The memory 104 is packaged or configured in any of a variety of different manners. Examples of such packaging or configuring include a dual in-line memory module (DIMM), a small outline DIMM (SO-DIMM), a registered DIMM (RDIMM), a non-volatile DIMM (NVDIMM), a ball grid array (BGA) memory permanently attached to (e.g., soldered to) a printed circuit board, and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 104 is configured as or includes a SO-DIMM or an RDIMM according to one of the above-mentioned standards (i.e., DDR, DDR2, DDR3, DDR4, and DDR5).

Alternatively, or in addition, the memory 104 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). The memory 104 is configurable in a variety of ways capable of supporting requests from the I/O device 106 for accessing the memory 104 to read data 114 from and/or write data 114 to the memory 104.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 104 is configurable in a variety of ways without departing from the spirit or scope of the described techniques.

In one or more implementations, a device driver 124 issues an I/O command 126 to the I/O device 106, such as to control the I/O device 106. For example, the device driver 124 issues the I/O command 126 in connection with execution of an application (not shown) on the processor 110. Broadly, the I/O command 126 instructs the I/O device 106 to perform an I/O operation, such as by accessing one or more portions of the memory 104. In one or more implementations, the I/O command 126 includes a size of the I/O operation and a location of a respective DMA buffer 128 in the memory 104. The device driver 124 is an instantiation of software executing on the processor 110 that enables communication between an operating system (e.g., implemented by the system 100) and the I/O device 106. Broadly, the device driver 124 acts as an intermediary between external hardware (i.e., the I/O device 106) and the operating system.

The I/O device 106 is any of a variety of hardware devices capable of handling an I/O command 126 from a respective device driver 124 executing on the processor 110 and carrying out the corresponding I/O operation by accessing (e.g., directly) one or more portions of the memory 104. Examples of such I/O devices include but are not limited to data stores, such as one or more of a solid-state drive (SSD), a flash drive, a hard disk drive (HDD), a universal serial bus (USB) drive, and so on; communication devices, such as one or more of a network interface adapter (NIC), a Bluetooth® (or other type of wireless communication) adapter and/or dongle, a modem, and so on; and/or peripherals such as printers, monitors, and input devices (e.g., mouse and keyboard). It is to be appreciated that in variations, the I/O device 106 is a different device than those described without departing from the spirit or the scope of the techniques described herein.

In accordance with the described techniques, the I/O device 106 sends requests 129 (e.g., multiple memory access requests) to the DMA controller 116 to access (e.g., read from or write to) various portions of the memory 104 to carry out the I/O operation, such as responsive to the I/O command 126. In at least one variation, for instance, the DMA engine 122 generates the requests 129 and causes the requests 129 to be transmitted over a connection provided by the DMA controller 116 for directly accessing respective portions of the memory 104 (e.g., isolated as the DMA buffers 128(0)-128(N) corresponding to the DMA engines 122(0)-122(N)), in accordance with DMA techniques.

In one or more implementations, the DMA engine 122 initiates transfers of the data 114 automatically based on preconfigured settings, and/or the DMA engine 122 is programmed by the processor 110 to perform specific transfers. Broadly, the DMA engine 122 enables high-speed data transfers without involving the processor 110. Rather than relying on the processor 110 to manage data transfers, the DMA engine 122 directly accesses the memory 104 and transfers the data 114 for the I/O device 106, which improves performance (e.g., throughput of a CPU) and reduces processor (e.g., CPU) overhead.

The DMA engine 122 controls memory access (or at least a portion of the memory access) by the I/O device 106, such as memory accesses requested in connection with carrying out an I/O operation as instructed by the I/O command 126. In at least one implementation, the DMA engine 122 is hardware integral with or integrated into the I/O device 106. In one or more implementations, for example, the DMA engine 122 includes a controller that manages the transfer of the data 114 (or a portion thereof) between the I/O device 106 (e.g., solid state or flash drives of the I/O device 106) and the memory 104 and further includes a set of buffers for at least temporarily storing the data 114 during the transfer.

The DMA controller 116 is a hardware component (e.g., a special-purpose digital circuit) enabling peripherals, such as the I/O devices 106, to directly communicate with the memory 104, bypassing the processor 110 to optimize high-speed data transfers between the I/O devices 106 and the memory 104. The DMA controller 116 utilizes one or more DMA channels to handle data transfers. Each DMA channel is capable of operating independently of the other DMA channels to enable separate data transfers. The DMA controller 116 operates in various modes, such as burst mode, cycle stealing, scatter-gather, and chain transfer. The DMA controller 116 utilizes specific registers to determine memory addresses and track transfer counts. The DMA controller 116 uses signals like DMA Request (DREQ) and DMA Acknowledge (DACK) for handshaking and arbitrates for control of the memory bus (not shown), potentially locking out the processor 110 during its operations.

The memory controller 118 is a hardware component (e.g., a special-purpose digital circuit) that manages flow of the data 114 between the processor 110 and the memory 104. The memory controller 118 handles requests from the core(s) 108 and/or other devices (e.g., peripheral devices) to read from and/or write to the memory 104. Although depicted in the example system 100 as being implemented as part of the SoC 102, in some alternative implementations, the memory controller 118 is implemented separately from the SoC 102, such as part of the memory 104. As another alternative, the memory controller 118 is implemented as part of the processor 110.

In accordance with one or more implementations, the memory controller 118 is associated with a single channel of the memory 104. For instance, the system 100 is configured to include a plurality of different memory controllers 118 on the same or different SoCs 102, one for each of a plurality of channels of the memory 104. The techniques described herein are thus performable using a plurality of different memory controllers 118 to schedule requests for different channels of the memory 104. In some implementations, a single channel in the memory 104 is allocated into multiple pseudo-channels. In such implementations, the memory controller 118 is configured to schedule requests for different pseudo-channels of a single channel in the memory 104.

The cache coherence controller 120 is a hardware component (e.g., a special-purpose digital circuit) configured to execute instructions, such as instructions to implement an adaptive algorithm 130, to ensure consistency of the data 114 across the caches 112 of the processor 110. In addition, the cache coherence controller 120 ensures coherence between the caches 112 and the DMA buffers 128 in the memory 104. During a write request (e.g., of the requests 129) to the memory 104, the cache coherence controller 120 checks if the contents of the destination memory location is stored in one or more of the caches 112. If so, to maintain data integrity of the system 100, the cache coherence controller 120 either invalidates the cache entry/entries or updates the cache entry/entries (e.g., changing the previous "dirty data" to "clean data"). During a read request (e.g., of the requests 129), the cache coherence controller 120 ensures that any modified data in the cache(s) 112 is appropriately updated before a DMA operation reads it. By performing these checks and actions, the cache coherence controller 120 ensures that operations of both the processor 110 and the DMA controller 116 are accessing the most up-to-date version of the data 114.

Figure 2:
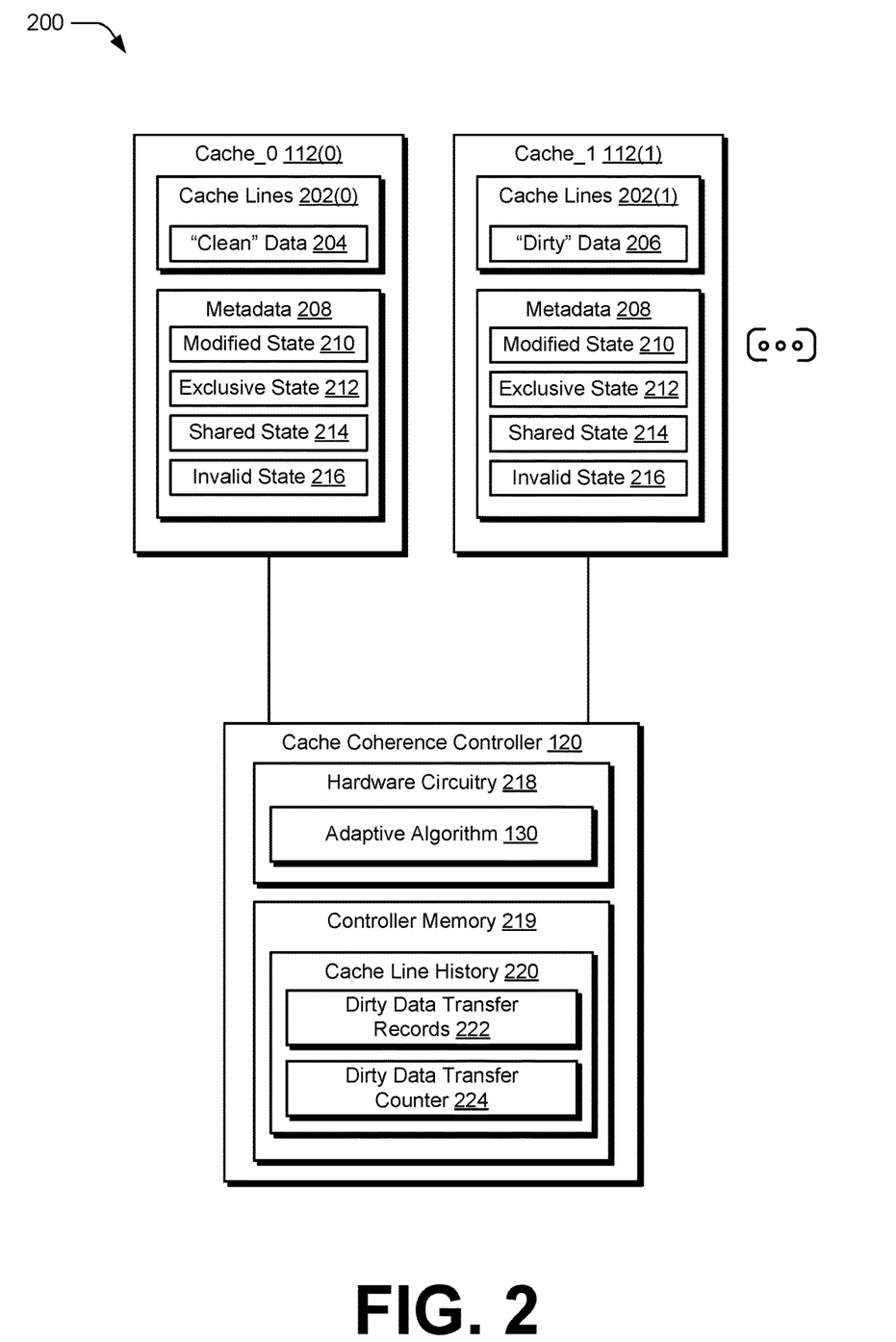
FIG. 2 is a block diagram depicting a non-limiting example of a cache coherence controller and a cache.

FIG. 2 is a block diagram depicting a non-limiting example of the cache coherence controller 120 and the cache 112. In particular, the illustrated example depicts two caches 112(0), 112(1) controlled by the cache coherence controller 120. Each of the caches 112 includes one or more cache lines 202. The cache lines 202 represent the fundamental unit of data transfer between the memory 104 and the caches 112. Instead of fetching individual bytes or words from the memory 104, the caches 112 use the cache lines 202 to exploit spatial locality and improve efficiency of the system 100. The cache lines 202 typically store between 32 bytes and 256 bytes of data 114.

The data 114 stored in the cache lines 202 is described herein as being "clean" or "dirty." In the illustrated example, the cache_0 112(0) includes one or more cache lines 202(0) that contain "clean" data 204, and the cache_1 112(1) includes one or more cache lines 202(1) that contain "dirty" data 206. The data 114 is considered "dirty" (i.e., "dirty" data 206) when it has been modified in the cache 112 and is different from the corresponding data 114 in the memory 104. Conversely, the data 114 is considered "clean" (i.e., "clean" data 204) when it has not been modified in the cache 112 since it was fetched from the memory 104 or when it matches the corresponding data 114 in the memory 104.

In the illustrated example, the caches 112 also include metadata 208 expressed in the form of status bits to indicate the state of the cache lines 202. The illustrated example shows four possible states for the cache lines 202, including a modified state 210, an exclusive state 212, a shared state 214, and an invalid state 216. In the modified state 210, the cache 112 has a version of the cache line 202 that has been modified (i.e., different data 114 than the memory 104). Cache lines 202 in the modified state 210 contain "dirty" data 206. In the exclusive state 212, the cache 112 has an exclusive copy of the cache line 202 (i.e., no other cache 112 has it). Cache lines 202 in the exclusive state 212 contain "clean" data 204 because the data 114 matches the memory 104. In the shared state 214, the cache line 202 is stored in one or more other caches 112. The data 114 in the shared state 214 also matches the memory 104. Cache lines 202 in the shared state 214 contain "clean" data 204 because coherency exists among the caches 112 and the memory 104. In the invalid state, the cache line 202 is not valid, and therefore the data 114 contained in the cache line 202 is not reliable and considered to be "dirty" data 206.

Although the illustrated metadata 208 is shown having four possible states, additional states can be implemented without departing from the spirit or scope of the described techniques. For example, in some implementations, an owned state is used to describe that the cache 112 has a modified copy of the cache line 202 and that the cache 112 is responsible for updating the memory 104.

The cache coherence controller 120 includes hardware circuitry 218 configured to execute the adaptive algorithm 130. In one or more implementations, the hardware circuitry 218 is a digital circuit configured to implement the adaptive algorithm 130 in hardware to perform various operations. In other implementations, the hardware circuitry 218 is configured to execute instructions of the adaptive algorithm 130 to perform various operations. The cache coherence controller 120 also includes a controller memory 219. The controller memory 219 is implemented as part of the hardware circuitry 218 or separate from the hardware circuitry 218. The controller memory 219 is configured similar to or the same as the memory 104 but as dedicated memory for the cache coherence controller 120. In one or more implementations, the controller memory 219 is a portion of the memory 104 that is dedicated for use by the cache coherence controller 120.

The controller memory 219 which is configured to store a cache line history 220 having dirty data transfer records 222. The cache line history 220, in some implementations, is stored in memory as part of the hardware circuitry 218 or separate from the hardware circuitry 218. The cache coherence controller 120 tracks the transfer of "dirty" data 206 among the caches 112. For example, if the "dirty" data 206 shown in the cache_1 112(1) is transferred to the cache_0 112(0), the cache coherence controller 120 updates the dirty data transfer records 222 to reflect this dirty data transfer. The dirty data transfer records 222 include, for example, the source cache (e.g., the cache_1 112(1)) and the destination cache (e.g., the cache_0 112(0)). The dirty data transfer records 222 also include, for example, a memory address associated with the data 114 when the data 114 was originally transferred from the memory 104 to the cache_1 112(1) (e.g., before the data 114 was modified to become the "dirty" data 206).

In one or more implementations, when a dirty data transfer occurs, the cache coherence controller 120 also increments a dirty data transfer counter 224 (e.g., plus one). A single dirty data transfer counter 224 is depicted and counts dirty data transfers for all of the caches 112. Multiple dirty data transfer counters 224 are also contemplated, such as one dirty data transfer counter 224 associated with each one of the caches 112.

Figure 3:
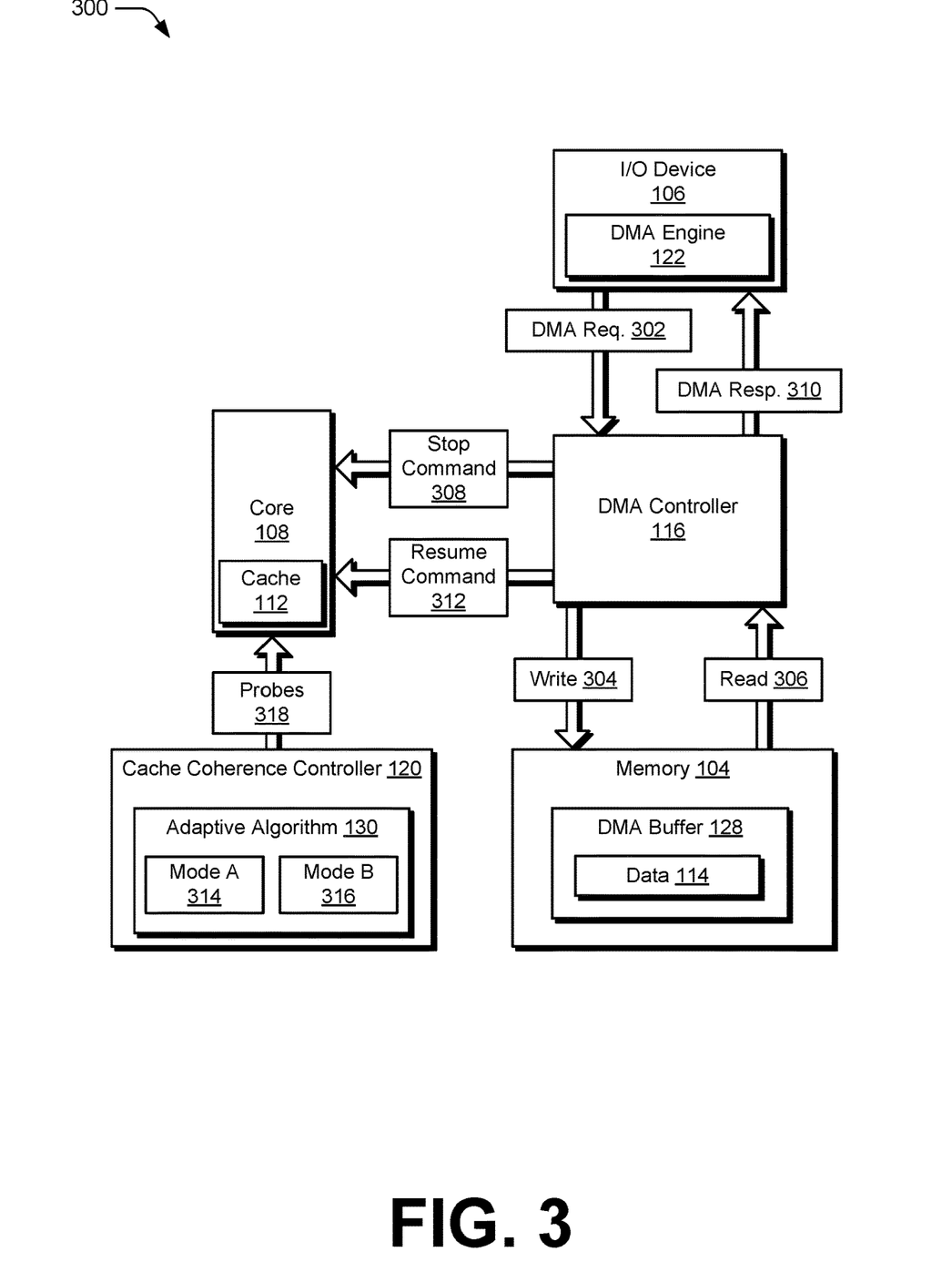
FIG. 3 is a block diagram depicting non-limiting example interactions among various components of the system depicted in FIG. 1.

FIG. 3 is a block diagram depicting non-limiting example interactions 300 among various components of the system 100 depicted in FIG. 1. In particular, the illustrated example includes the memory 104 having the DMA buffer 128 storing the data 114, the I/O device 106 having the DMA engine 122, the core 108 associated with the cache 112, the DMA controller 116, and the cache coherence controller 120 having the adaptive algorithm 130.

The DMA engine 122 generates a DMA request 302 (e.g., as one of the requests 129) and sends the DMA request 302 to the DMA controller 116. The DMA controller 116 determines if the DMA request 302 is a read request or a write request. For a write request, the DMA request 302 includes data 114 to be written to the memory 104, and in particular, to the DMA buffer 128 assigned to the DMA engine 122 of the I/O device 106. The DMA controller 116 receives the write request and sends a write command 304 to the memory 104. For a read request, the DMA request 302 identifies the DMA buffer 128 from which to read the data 114. For example, the DMA engine 122 identifies the DMA buffer 128 based on the I/O command 126 received from the processor 110 (shown in FIG. 1). The DMA controller 116 receives the read request and requests the data 114 from the memory 104 in a read command 306.

In response to the DMA request 302, the DMA controller 116 also determines whether the core 108 commands the memory bus (i.e., whether the core 108 is actively using the memory bus to communicate with the memory 104). If so, the DMA controller 116 generates a stop command 308 directed to the core 108. The stop command 308 instructs the core 108 to give up control of the memory bus to allow the DMA controller 116 access to the memory 104 to perform the write command 304 or the read command 306 on behalf of the DMA engine 122 of the I/O device 106. When the DMA controller 116 completes operations associated with the DMA request 302, the DMA controller 116 generates a DMA response 310 and sends the DMA response 310 to the DMA engine 122. The DMA response 310 includes the data 114 retrieved responsive to the read command 306 or an acknowledgment of the write command 308. The DMA controller 116 also issues a resume command 312 to the core 108. The core 108, in response, resumes control of the memory bus.

Also, responsive to the DMA request 302, the cache coherence controller 120 executes the adaptive algorithm 130 to determine the cache line 202 that holds the data 114 associated with the DMA request 302. The cache coherence controller 120 then checks the cache line history 220 to determine if the cache line 202 is associated with a dirty data transfer. If the cache coherence controller 120 determines that the cache line 202 is not associated with a dirty data transfer, the cache coherence controller 120 enters mode A 314 and performs normal operations. In other words, the cache coherence controller 120 does not change the state of the cache line 202. If, instead, the cache coherence controller 120 determines that the cache line 202 is associated with a dirty data transfer, the cache coherence controller 120 enters mode B 316 and executes the adaptive algorithm 130 to generate one or more probes 318 directed to the cache 112. The probes 318 either invalidate the cache line 202 or convert the data 114 in the cache line 202 from dirty to clean based upon the state of the cache line 202.

Figure 4:
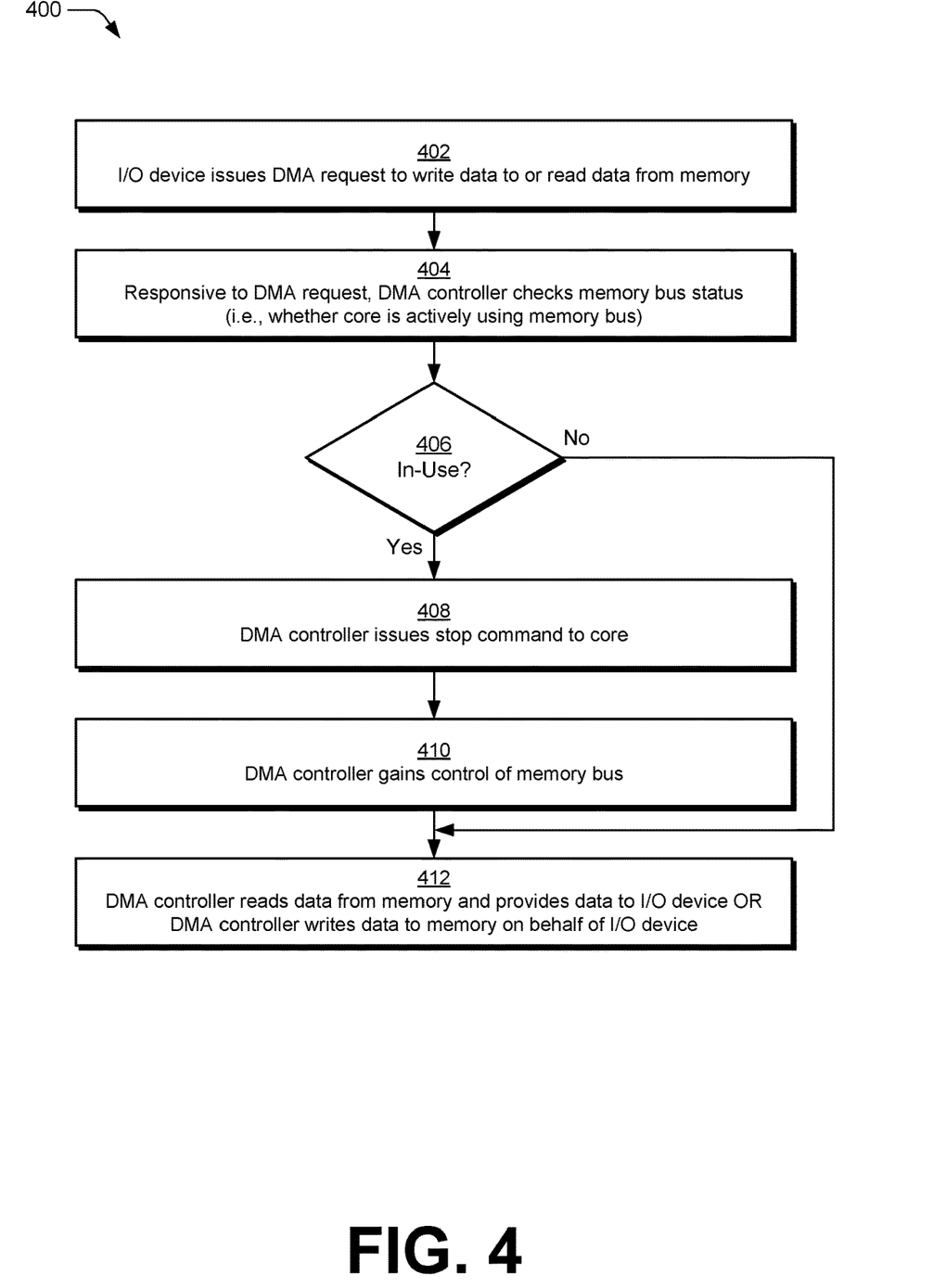
FIG. 4 is a flow diagram depicting a procedure in a non-limiting example implementation of a DMA controller configured to perform operations to minimize I/O dirty data transfers.

FIG. 4 is a flow diagram depicting a procedure 400 in a non-limiting example implementation of the DMA controller 116 configured to perform operations to minimize I/O dirty data transfers. The procedure 400 begins and the I/O device 106 issues the DMA request 302 to write data 114 to or read data 114 from the memory 104 (block 402). For example, the DMA engine 122 of the I/O device 106 generates the DMA request 302 and sends the DMA request 302 to the DMA controller 116. In at least one implementation, the DMA engine 122 is hardware integral with or integrated into the I/O device 106. In one or more implementations, for example, the DMA engine 122 includes a controller that manages the transfer of the data 114 (or a portion thereof) between the I/O device 106 (e.g., solid state or flash drives of the I/O device 106) and the memory 104 and further includes a set of buffers for at least temporarily storing the data 114 during the transfer.

Responsive to the DMA request 302, the DMA controller 116 checks the memory bus status (block 404) to determine whether the core 108 is actively using the memory bus (block 406). For example, the DMA controller 116 checks the memory bus status using bus request and grant signals, and employs arbitration logic and priority scheduling to ensure smooth and conflict-free access to the memory 104 to write or read the data 114. After the data 114 is transferred, the DMA controller 116 releases the memory bus and continues monitoring the status of the memory bus to prevent conflicts with the core 108 and/or other devices.

If the processor 110 (e.g., the core 108) is actively using the memory bus, the DMA controller 116 issues the stop command 308 to the core 108 (block 408) and the DMA controller 116 gains control of the memory bus (block 410). The stop command 308 instructs the core 108 to give up control of the memory bus to allow the DMA controller 116 access to the memory 104 to perform the write command 304 or the read command 306 on behalf of the DMA engine 122 of the I/O device 106. The DMA controller 116 then reads the data 114 from the memory 104 and provides the data 114 to the I/O device 106 (block 412). Alternatively, the DMA controller 116 writes the data 114 to the memory 104 on behalf of the I/O device 106 (block 412). In this manner, the DMA controller 116 bypasses the processor 110 for reading the data 114 from or writing the data 114 to the memory 104.

Returning to block 406, if the processor 110 (e.g., the core 108) is not actively using the memory bus, the DMA controller 116 reads the data 114 from the memory 104 and provides the data 114 to the I/O device 106 (block 412). Alternatively, the DMA controller 116 writes the data 114 to the memory 104 on behalf of the I/O device 106 (block 412).

Figure 5:
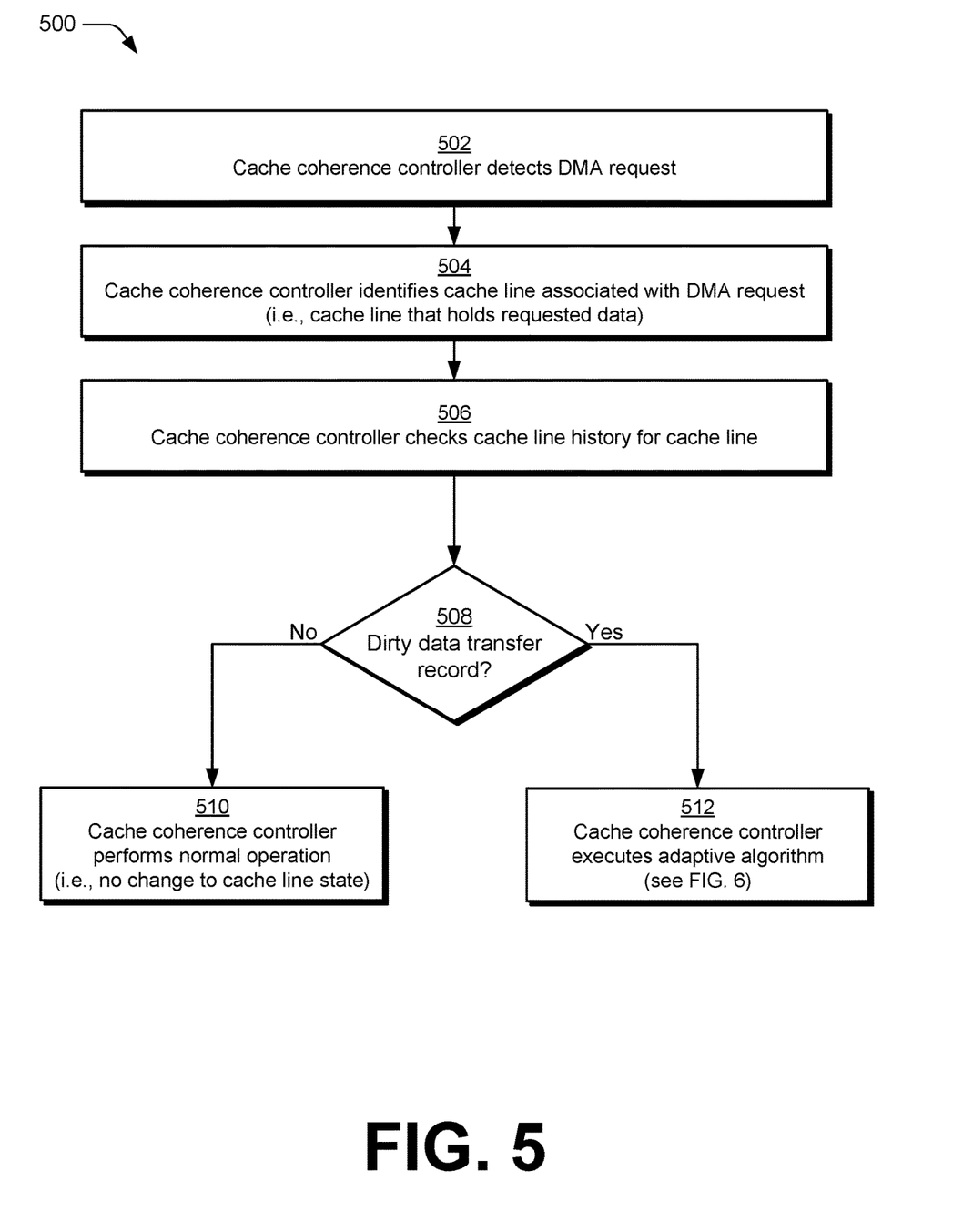
FIG. 5 is a flow diagram depicting a procedure in a non-limiting example implementation of a cache coherence controller configured to selectively execute an adaptive algorithm.

FIG. 5 is a flow diagram depicting a procedure 500 in a non-limiting example implementation of the cache coherence controller 120 configured to perform operations to selectively execute the adaptive algorithm 130. The procedure 500 begins and the cache coherence controller 120 detects the DMA request 302 (block 502). For example, when the I/O device 106 requires data transfer, the I/O device 106 (e.g., via the DMA engine 122) sends a signal to the DMA controller 120. The DMA controller 120 detects the DMA request 302, which then initiates the DMA process to transfer data directly between the I/O device 106 and the memory 104, bypassing the processor 110.

The cache coherence controller 120 identifies the cache line 202 associated with the DMA request 302 (block 504). That is, the cache coherence controller 120 identifies the cache line 202, if any, that holds the requested data 114). The cache coherence controller 120 then checks the cache line history 220 for the cache line 202 (block 506) to determine whether the cache line history 220 contains a dirty transfer record 222 for the cache line 202 (block 508). The dirty data transfer records 222 include, for example, the source cache (e.g., the cache_1 112(1)) and the destination cache (e.g., the cache_0 112(0)). The dirty data transfer records 222 also include, for example, a memory address associated with the data 114 when the data 114 was originally transferred from the memory 104 to the cache_1 112(1) (e.g., before the data 114 was modified to become the "dirty" data 206).

If the cache line history 220 does not contain a dirty data transfer record 222 for the cache line 202 (as determined at block 508), then the cache coherence controller 120 performs normal operation in mode A 314. The normal operation in mode A 314 does not change the cache line state. If, however, the cache line history 220 contains a dirty data transfer record 222 for the cache line 202 (as determined at block 508), the cache coherence controller 120 executes the adaptive algorithm 130 in the mode B 316. Additional details in this regard are described below with reference to FIG. 6.

Figure 6:
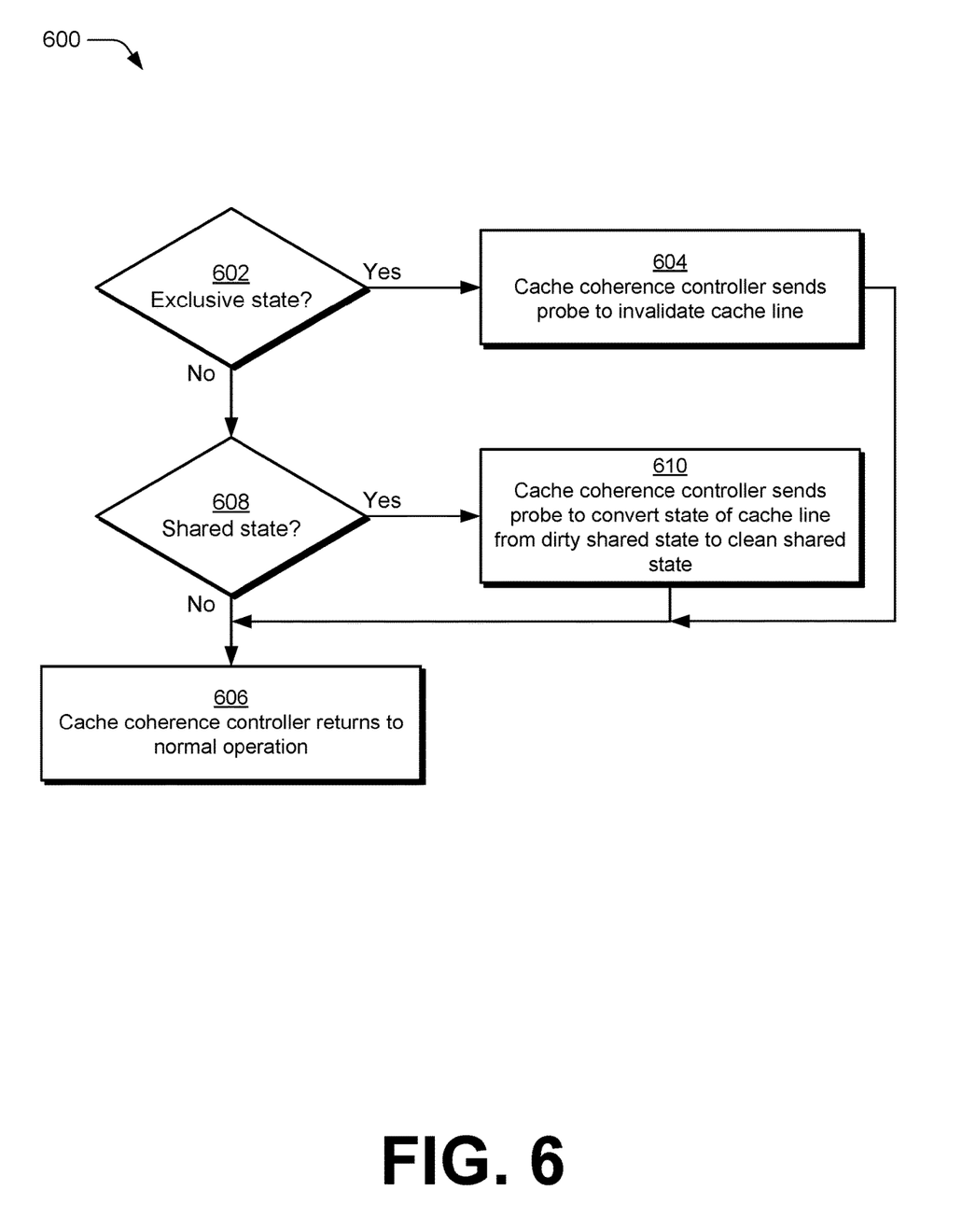
FIG. 6 is a flow diagram depicting another procedure in a non-limiting example implementation of a cache coherence controller configured to perform operations to minimize I/O dirty data transfers.

FIG. 6 is a flow diagram depicting another procedure 600 in a non-limiting example implementation of the cache coherence controller 120 configured to perform operations to minimize I/O dirty data transfers. The procedure 600 begins and the cache coherence controller 120 determines if the state of the cache line 202 is the exclusive state 212 (block 602). In the exclusive state 212, the cache 112 has an exclusive copy of the cache line 202 (i.e., no other cache 112 has it). Cache lines 202 in the exclusive state 212 contain "clean" data 204 because the data 114 matches the memory 104. If the cache coherence controller 120 determines that the state of the cache line 202 is the exclusive state 212 (as determined at block 602), the cache coherence controller 120 sends the probe 318 to invalidate the cache line 202 (block 604). In particular, the cache coherence controller 120 changes the state of the cache line 202 from the exclusive state 212 to the invalid state 216 (block 604). In the invalid state, the cache line 202 is not valid, and therefore the data 114 contained in the cache line 202 is not reliable and considered to be "dirty" data 206.

If the cache coherence controller 120 instead determines that the state of the cache line 202 is not in the exclusive state 212 (as determined at block 602), the cache coherence controller 120 determines if the state of the cache line 202 is in the shared state 214 (block 608). In the shared state 214, the cache line 202 is stored in one or more other caches 112. The data 114 in the shared state 214 also matches the memory 104. Cache lines 202 in the shared state 214 contain "clean" data 204 because coherency exists among the caches 112 and the memory 104. The data 114 is considered "clean" (i.e., "clean" data 204) when it has not been modified in the cache 112 since it was fetched from the memory 104 or when it matches the corresponding data 114 in the memory 104.

If the cache coherence controller 120 determines that the cache line 202 is in the shared state 214 (as determined at block 608), the cache coherence controller 120 sends the probe 318 to convert the cache line 202 from a dirty shared state to a clean shared state (block 610).

The cache coherence controller 120 then returns to normal operation (block 606). If the cache coherence controller 120 instead determines that the cache line 202 is not in the shared state 214 (block 608), the cache coherence controller 120 then returns to normal operation (block 606). For example, the normal operation is mode A 314 in which the cache line state does not change.

It will be understood that many variations are possible based on the disclosure herein. Although features and controls are described above in particular combinations, each feature or control is usable alone without the other features and controls or in various combinations with or without other features and controls.

The various functional units illustrated in the figures and/or described herein (including, where appropriate, the system 100, the SoC 102, the memory 104, the I/O device 106, the cores 108, the processor 110, the caches 112, the DMA controller 116, the memory controller 118, the cache coherence controller 120, the DMA engines 122, and the device driver 124) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
a processor;
a memory configured to store data;
a cache configured to store a portion of the data stored in the memory for execution by the processor; and
a cache coherence controller comprising a cache line history, the cache coherence controller configured to:
identify a cache line associated with a direct memory access request, the direct memory access request associated with an operation involving the data; and
responsive to the cache line history including a dirty data transfer record corresponding to the cache line, selectively send a probe to the cache, the dirty data transfer record including information that indicates whether a dirty transfer was triggered by a previous request for the cache line.

2. The system of claim 1, wherein the cache coherence controller is configured to selectively send the probe to the cache based on a state of the cache line, the state of the cache line comprising a modified state, an exclusive state, a shared state, or an invalid state.

3. The system of claim 2, wherein the cache coherence controller is further configured to, in response to determining that the state of the cache line is the exclusive state, send the probe to the cache to invalidate the cache line.

4. The system of claim 2, wherein the cache coherence controller is further configured to, in response to determining that the state of the cache line is the shared state, send the probe to convert the state of the cache line from a dirty shared state to a clean shared state.

5. The system of claim 1, wherein the processor comprises a first core and a second core, and wherein the cache comprises a first cache corresponding to the first core and a second cache corresponding to the second core.

6. The system of claim 5, wherein the first cache stores the portion of the data in the cache line.

7. The system of claim 5, wherein the first core transfers the portion of the data from the first cache to the second cache.

8. The system of claim 5, wherein the first core modifies the portion of the data to create a new portion of the data that is different from the portion of the data.

9. The system of claim 8, wherein the cache coherence controller is further configured to update the cache line history to reflect that the portion of the data was modified before being transferred to the second cache.

10. The system of claim 1, wherein the operation involving the data comprises an input or output operation.

11. The system of claim 1, wherein the cache coherence controller is configured to selectively send the probe to the cache by sending the probe to the cache if the information in the dirty data transfer record indicates that the dirty transfer was triggered by the previous request for the cache line.

12. The system of claim 1, wherein the cache coherence controller is configured to selectively send the probe to the cache by not sending the probe to the cache if the information in the dirty data transfer record indicates that the dirty transfer was not triggered by the previous request for the cache line.

13. A cache coherence controller comprising:
a memory configured to store a cache line history; and
a hardware circuitry configured to:
identify a cache line associated with a direct memory access request, the direct memory access request associated with an operation involving data stored in a cache; and responsive to the cache line history including a dirty data transfer record corresponding to the cache line, selectively send a probe to the cache, the dirty data transfer record including information that identifies whether a dirty transfer was triggered by a previous request for the cache line.

14. The cache coherence controller of claim 13, wherein hardware circuitry comprises the memory.

15. The cache coherence controller of claim 13, wherein the hardware circuitry is configured to selectively send the probe to the cache based on a state, the state comprising a modified state, an exclusive state, a shared state, or an invalid state.

16. The cache coherence controller of claim 15, wherein the hardware circuitry is further configured to, in response to determining that the state of the cache line is the shared state, send the probe to convert the state of the cache line from a dirty shared state to a clean shared state.

17. The cache coherence controller of claim 13, wherein the hardware circuitry is further configured to update the cache line history to reflect that a portion of the data was modified before being transferred to the cache.

18. The cache coherence controller of claim 13, wherein the operation involving the data comprises an input operation or an output operation.

19. A method comprising:
detecting, by a cache coherence controller, a direct memory access request from a direct memory access engine of an input/output device, the direct memory access request associated with an input/output operation performed by the input/output device; and
responsive to detecting the direct memory access request, selectively executing, by the cache coherence controller, an adaptive algorithm to ensure coherency of data between a plurality of caches and a memory, the data associated with the input/output operation, wherein the cache coherence controller selectively executes the adaptive algorithm based on a dirty data transfer record that includes information regarding previous requests to the caches.

20. The method of claim 19, wherein selectively executing, by the cache coherence controller, the adaptive algorithm comprises executing, by the cache coherence controller, the adaptive algorithm in response to the data being associated with a dirty data transfer from a first cache of the plurality of caches to a second cache of the plurality of caches.

* * * * *